(12) United States Patent
Cui et al.

(10) Patent No.: US 11,930,519 B2
(45) Date of Patent: Mar. 12, 2024

(54) MECHANISM OF MEASUREMENT SHARING AND RESTRICTION FOR CSI-RS AND SSB BASED UE ACTIVITIES IN NR

(71) Applicant: Apple Inc., Cupertino, CA (US)

(72) Inventors: Jie Cui, San Jose, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US); Yang Tang, San Jose, CA (US); Yuchul Kim, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,652

(22) PCT Filed: Feb. 12, 2020

(86) PCT No.: PCT/CN2020/074946
§ 371 (c)(1),
(2) Date: Sep. 17, 2021

(87) PCT Pub. No.: WO2021/159350
PCT Pub. Date: Aug. 19, 2021

(65) Prior Publication Data
US 2022/0377755 A1    Nov. 24, 2022

(51) Int. Cl.
*H04W 24/10* (2009.01)
*H04L 5/00* (2006.01)
*H04W 72/54* (2023.01)

(52) U.S. Cl.
CPC .......... *H04W 72/54* (2023.01); *H04L 5/0048* (2013.01)

(58) Field of Classification Search
CPC . H04W 72/23; H04W 24/10; H04W 72/1268; H04W 72/21; H04W 84/042;
(Continued)

(56) References Cited

U.S. PATENT DOCUMENTS

| | | |
|---|---|---|
| 2018/0337757 A1 | 11/2018 | Noh et al. |
| 2018/0359716 A1 | 12/2018 | Bai et al. |

(Continued)

FOREIGN PATENT DOCUMENTS

| | | | |
|---|---|---|---|
| CN | 110167134 A | 8/2019 | |
| WO | WO 2019242775 A1 | 12/2019 | |
| WO | WO-2019242775 A1 * | 12/2019 | ............. A01G 31/02 |

OTHER PUBLICATIONS

International Search Report and Written Opinion of the International Searching Authority directed to related International Patent Application No. PCT/CN2020/074946, dated Nov. 25, 2020.
(Continued)

*Primary Examiner* — Quan M Hua
(74) *Attorney, Agent, or Firm* — Sterne, Kessler, Goldstein & Fox P.L.L.C.

(57) ABSTRACT

Measurement resources are often limited in 5G and 4G-LTE communications. As a result, SMTC and CSI-RS measurement windows will occasionally be assigned to the same resource elements of a signal frame. This results in a collision that must be resolved, since both measurements cannot be performed simultaneously. The collision can be resolved using restriction, where overlapping resource elements are assigned to either the SMTC or the CSI-RS measurements, or can be resolved using measurement sharing, where overlapping resource elements are divided (Continued)

among the two measurements according to a measurement sharing factor. Various factors, including priority or window periodicity may be taken into account by the measurement rules that dictate collision resolution.

20 Claims, 11 Drawing Sheets

(58) Field of Classification Search
CPC ..... H04W 24/02; H04W 76/11; H04W 60/00; H04W 74/0808; H04W 74/0833; H04W 72/0446; H04W 8/186; H04W 8/205; H04W 72/0453; H04W 16/14; H04W 28/0268; H04W 68/005; H04W 52/42; H04W 72/1215; H04W 72/53; H04W 72/56; H04W 72/542; H04W 88/08; H04W 88/085; H04W 84/12; H04W 88/06; H04W 76/28; H04W 36/08; H04W 36/0085; H04W 36/0088; H04W 28/18; H04W 28/0865; H04W 28/0835; H04W 28/0861; H04L 5/0051; H04L 5/0048; H04L 5/0053; H04L 5/0094; H04L 5/001; H04L 5/0044; H04L 27/0006; H04L 5/0023; H04L 5/0057; H04L 1/08; Y02D 30/70

See application file for complete search history.

(56) References Cited

U.S. PATENT DOCUMENTS

| 2019/0253906 | A1 | 8/2019 | Lin | |
| 2021/0385676 | A1* | 12/2021 | Yu | H04W 24/08 |
| 2022/0086843 | A1* | 3/2022 | Ying | H04W 72/541 |
| 2022/0086907 | A1* | 3/2022 | Kundu | H04L 27/26025 |

OTHER PUBLICATIONS

R1-1801332, "Remaining details on NR RRM," 3GPP TSG RAN WG1 Meeting #92, Mar. 2, 2018; 10 pages.

Nokia et al.: "Measurements for mobility management", 3GPP Draft; Ri- 1721363, Update of R1-1720884, Nov. 27, 2017; 23 pages.

Extended European Search Report directed to related European Application No. 20919034. 7, dated Jul. 14, 2023; 11 pages.

* cited by examiner

MECHANISM OF MEASUREMENT SHARING AND RESTRICTION FOR CSI-RS AND SSB BASED UE ACTIVITIES IN NR

This application is a U.S. National Phase of International Application No. PCT/CN2020/074946, filed Feb. 12, 2020, which is hereby incorporated by reference in its entirety.

FIELD

Various embodiments generally may relate to the field of wireless communications.

SUMMARY

In an embodiment, a method for resolving measurement collision in a wireless communication system. The method comprises identifying a period of overlap in which a Synchronization Signal Block [SSB] Measurement Timing Configuration (SMTC) measurement window overlaps with a CSI-RS measurement window. A set of overlap rules is stored that govern measurement signal transmissions during the period of overlap. For the period of overlap, it is determined whether to transmit an SMTC measurement signal, a CSI-RS measurement signal, or a portion of both the SMTC measurement signal and the CSI-RS measurement signal based on the stored set of overlap rules. Based on this determination, at least one of the SMTC measurement signal and the CSI-RS measurement are assigned to collision resource elements corresponding to the period of overlap. The at least one of the SMTC measurement signal and the CSI-RS measurement signal are then transmitted to a UE based on the assigning.

In another embodiment, a method for resolving measurement collision in a wireless communication system. The method comprises receiving an SMTC measurement allocation corresponding to an SMTC measurement, and also receiving a CSI-RS measurement allocation corresponding to a CSI-RS measurement. Based on the measurement allocation, at least one collision resource element is identified. A collision rule is retrieve in response to the identifying, and at least one of an SMTC measurement signal or a CSI-RS measurement signal are assigned to the at least one collision resource element based on the collision rule. A signal frame that includes the assigned measurement signals is then transmitted.

In another embodiment, a base station is disclosed for resolving measurement collision in a wireless communication system. The base station comprises a transceiver configured to receive an SMTC measurement window and a CSI-RS measurement window, a memory that stores a collision rule governing collision measurement signal assignments, and one or more processors. The processors are configured to perform several functions associated with the collision resolution. Namely, a collision period is identified in which the SMTC measurement window overlaps with the CSI-RS measurement window. For the collision period, it is determined whether to transmit an SMTC measurement signal, a CSI-RS measurement signal, or both the SMTC measurement signal and the CSI-RS measurement signal based on the stored collision rule. At least one of the SMTC measurement signal or the CSI-RS measurement is assigned to resource elements within the collision period based on the determining so as to generate a measurement signal frame. The transceiver then transmits the measurement signal frame to a UE.

In embodiments, the assigning includes assigning the SMTC measurement signal to a subset of the collision resource elements, and assigning the CSI-RS measurement signal to a remainder of the collision resource elements according to measurement sharing factor.

In embodiments, the measurement sharing factor MSF is a percentage in the range of 0 to 100.

In embodiments, the subset of the collision resource elements corresponds to a first MSF % of the collision resource elements, and the remainder of the collision resource elements corresponds to a latter (100–MSF) % of the collision resource elements.

In embodiments, the method further comprises comparing a periodicity of the SMTC measurement window with a periodicity of the CSI-RS measurement window.

In embodiments, the method further comprises identifying a shorter measurement signal as one of the SMTC measurement signal or the CSI-RS measurement signal having a shorter periodicity than the other of the SMTC measurement signal or the CSI-RS measurement signal, wherein the assigning includes assigning the shorter measurement signal to a period of non-overlap.

In embodiments, the method further comprises storing a measurement sharing factor MSF as a percentage in the range of 0 to 100 and identifying a shorter measurement signal as one of the SMTC measurement signal or the CSI-RS measurement signal having a shorter periodicity than a longer measurement signal being the other of the SMTC measurement signal or the CSI-RS measurement signal. In embodiments, the assigning includes assigning the shorter measurement signal to occur during a first MSF % of the period of overlap, and assigning the longer measurement signal to occur during a latter (100–MSF) % of the period of overlap.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
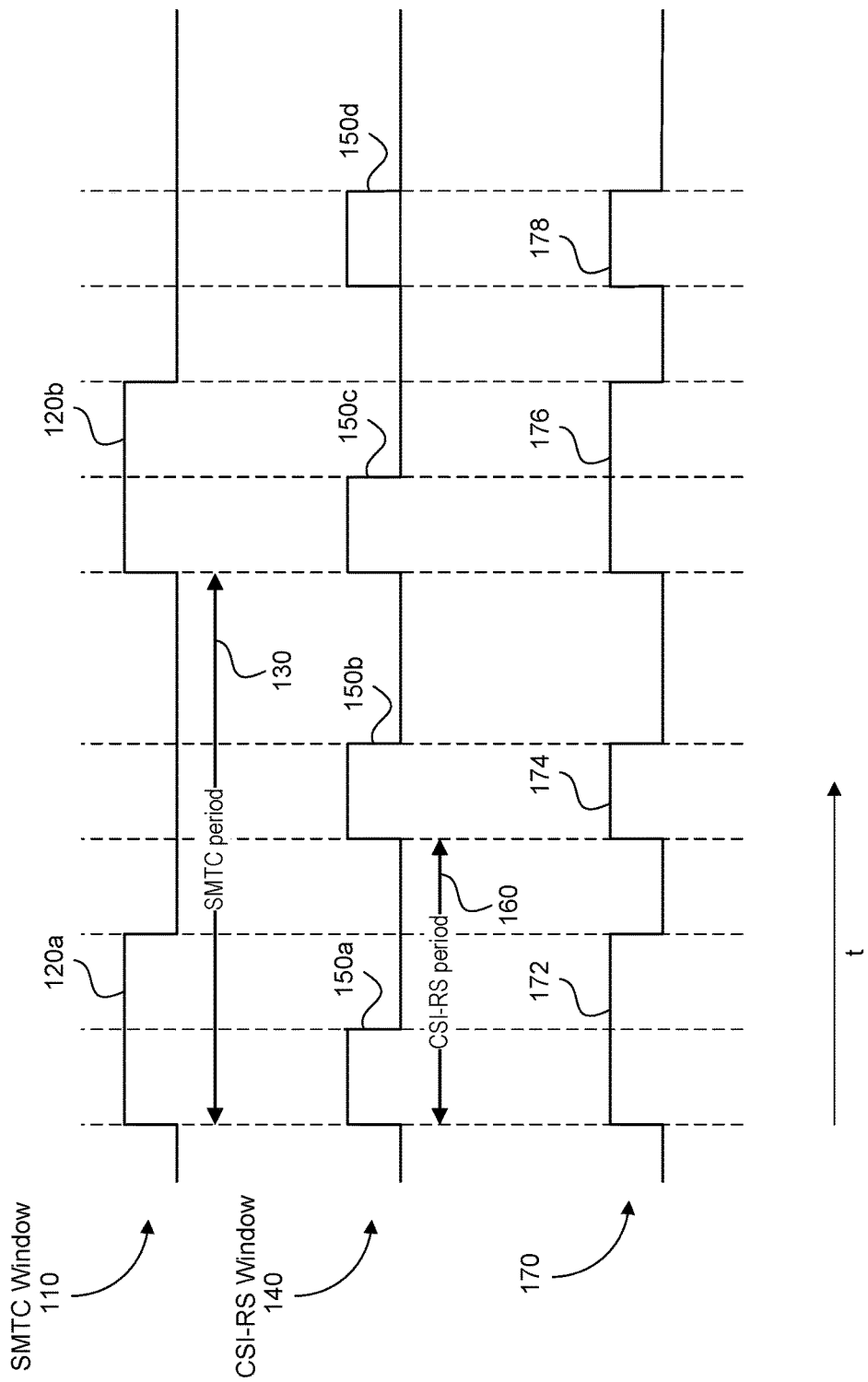
FIG. 1 illustrates exemplary measurement signal transmissions according to an embodiment.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In 4G-LTE and 5G specification, 3GPP defines a variety of different measurements to be taken for purposes of analyzing channel conditions, beam management (BM), synchronization, tracking, mobility monitoring, etc. The measurements rely on predetermined sequences known by both base stations (BS) and user equipment (UE) to evaluate communication conditions and establish connections. For example, channel state information reference signal (CSI-RS) may contain a predetermined sequence transmitted by the BS and received by the UE. Since the UE knows the sequence, the UE compares the received sequence and the transmitted sequence to evaluate distortion introduced by the channel, thereby estimate the channel quality from the BS to the UE.

These measurements are beneficial for improving efficiency, correctness and robustness of a wireless link. However, since the measurements share radio resources with data transmission—which is not known by the UE when transmitted from the BS—there are trade-offs between the measurements and the data transmission. For example, when more radio resources are assigned to the measurements, a more reliable and efficient communication link may be established at the cost of a lower data rate. Conversely, when the data rate is sought to be increased, it may become difficult to assign each measurement an exclusive radio resource. As a result, the measurements may collide with one another (e.g., overlap in time and channel). When such a collision occurs, the measurements of the colliding signals cannot be performed simultaneously.

For example, in Releases 15 and 16 of the 3GPP specification, a CSI-RS based L3 measurement and an L3 SSB measurement will occasionally collide with each other. Yet, no solution for resolving this collision has been defined. The present disclosure describes a solution for resolving this conflict, allowing the UE to effectively carry out the CSI-RS and SSB measurements, even when an overlap occurs.

FIG. 1 illustrates exemplary measurement signal configurations according to an embodiment. As shown in FIG. 1, an SMTC measurement configuration 110 includes multiple SMTC measurement windows 120a/120b. The SMTC measurement windows 120 have a periodicity 130. A CSI-RS measurement configuration 140 is also illustrated. The CSI-RS measurement configuration 140 includes a plurality of CSI-RS measurement windows 150a-150d, with a periodicity 160.

As background, each measurement signal is assigned to certain resource blocks (e.g., time-frequency units) within a signal frame. The network sets these assignments, and then notifies the base station.

For ease of understanding, the SMTC measurement configuration 110 and the CSI-RS measurement configuration 140 are illustrated as being aligned in time. However, it should be understood that each of the measurement configurations correspond to the assignment of resources in a same frequency channel (e.g., row) of the signal frame. Thus, any overlap in the measurement windows of these measurement configurations are indicative of a collision in the signal frame—where both measurement signals are assigned to same resource elements.

As shown in FIG. 1, the CSI-RS measurement window 150a overlaps with a portion of the (synchronization signal block [SSB] based measurement timing configuration) SMTC measurement window 120a, and channel state information reference signal (CSI-RS) measurement window 150c overlaps with a portion of SMTC measurement window 120b. Meanwhile, CSI-RS measurement windows 150b and 150d do not overlap with any SMTC measurement windows. Because multiple measurements cannot be carried out simultaneously, a resultant measurement signal transmission 170 includes transmission windows 172, 174, 176 and 178. Transmission windows 174 and 178 can correspond directly to CSI-RS measurement windows 150b and 150d (because those transmission windows do not collide with SMTC measurement windows). Meanwhile, for the transmission windows 172 and 176, decisions must be made regarding how to reconcile the collisions between the CSI-RS measurement windows and the SMTC measurement windows during those time periods. The following disclosure describes exemplary reconciliations according to various embodiments.

Figure 2:
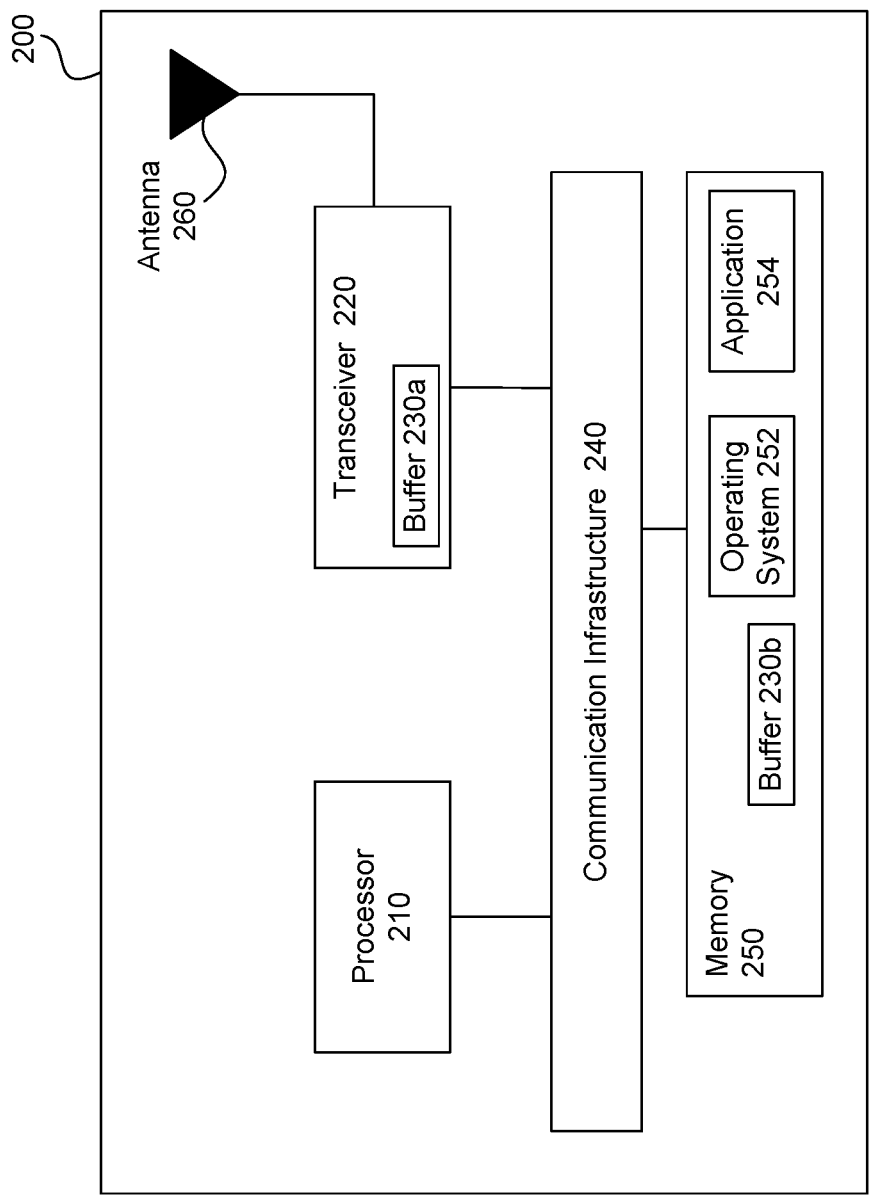
FIG. 2 illustrates a block diagram of an exemplary base station 200 according to an embodiment.

FIG. 2 illustrates a block diagram of an example wireless system 200 of an electronic device implementing the measurement signal collision resolution, according to some embodiments of the disclosure. System 200 may be any of the electronic devices (e.g., AP 1010, STA 1020) of system 1000. System 200 includes processor 210, transceiver 220, buffer(s) 230a and 230b, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, measurement collision resolution, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 perform operations enabling wireless system 200 of system 1000 to implement the measurement collision resolution as described herein. Additionally or alternatively, transceiver 220 performs operations enabling wireless system 200 of system 1000 to implement the measurement collision resolution as described herein.

Transceiver 220 transmits and receives communications signals that support the measurement collision resolution, according to some embodiments, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, implements the measurement collision resolution. For example, system 200 is configured to analyze measurement configurations and generate measurement signals according to one or more measurement rules, as will be discussed in further detail below.

According to some embodiments, processor 210, alone or in combination with transceiver 220 and/or memory 205 can receive rules and/or parameters associated with the measurement collision resolution. Processor 210, alone or in combination with transceiver 220 and/or memory 205, can determine, generate, and transmit the measurement signals based on the received rules and/or parameters.

Figure 3:
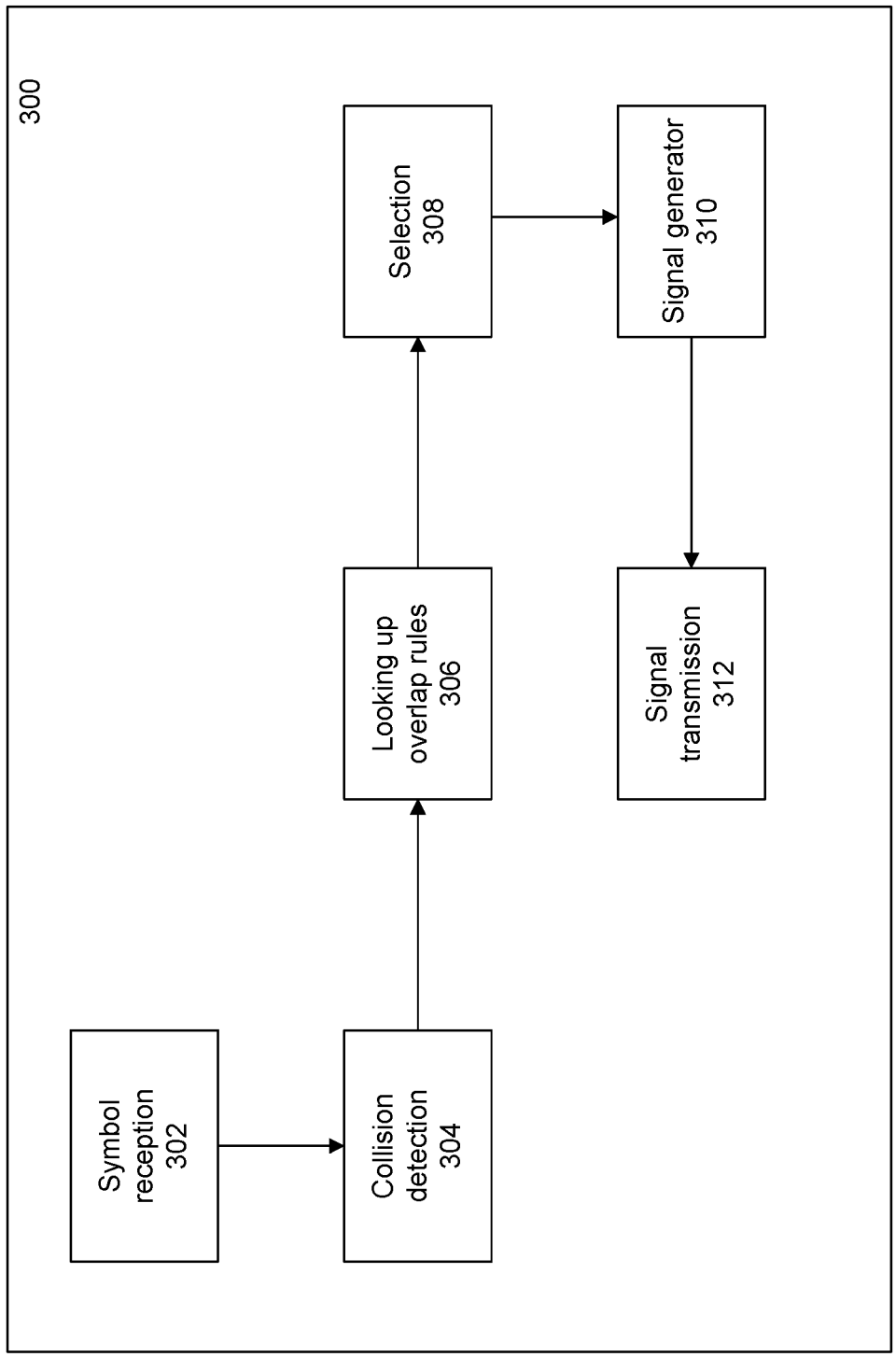
FIG. 3 illustrates a functional block diagram of exemplary collision resolution functions that may be carried out by a processor.

FIG. 3 illustrates a functional block diagram of exemplary collision resolution functions that may be carried out by a processor 300. In an embodiment, the processor 300 represents an exemplary embodiment of the processor 210, which carries out the functions of FIG. 3.

As shown in FIG. 3, the processor 300 includes a symbol reception block 302. Measurement symbols (for SSB and CSI-RS) are usually preset by standard or OEM, and are stored in a table in the memory of the base station 300 (e.g., memory 250 of base system 200). The symbol reception block 302 reads these measurement symbols from the memory.

The processor 300 also includes a collision detection block 304. The collision detection block 304 analyzes the SMTC and CSI-RS measurement windows to determine whether a collision will occur between the measurement symbols. Specifically, the collision detection block examines the radio resources assigned to the SMTC and CSI-RS measurement windows. If any of the radio resources are assigned to both measurements, the collision detection block 304 determines whether any of the measurement windows of the received measurement symbols overlap in time.

The processor 300 further includes a Rule Lookup 306. The Rule Lookup 306 retrieves overlap rules from the memory in response to the collision detection block 304 detecting a collision between the received measurement symbols. In an embodiment, the overlap rules define how resource elements of the colliding measurement windows should be filled. In other words, the overlap rules define which measurement symbols should be used to fill the resource elements that are subject to collision. The overlap rules are stored in the memory of the base station 200.

Rule selection 308 selects an appropriate rule based on the circumstances of the detected collision. For example, in an embodiment, multiple rules may be stored corresponding to a variety of different collision circumstances. For example, different rules may govern scenarios in which the periodicity of the SSB measurement windows are shorter than the periodicity of the CSI-RS measurement windows, scenarios in which the periodicity of the CSI-RS measurement windows are shorter than the periodicity of the SSB measurement windows. In addition, the SSB measurement may be more important than the CSI-RS measurement, or vice versa, under varying circumstances. As a result, a rule may instruct that the measurement with higher importance occupy a larger portion of the overlapping resource elements. Other scenarios are also discussed in further detail below. Thus, the rule selection 308 selects an appropriate rule for the given circumstances.

A signal generator 310 generates the appropriate measurement signals based on the collision rule selected by rule selection 308. These measurements signals are then transmitted by measurement signal transmission 312 using for example transceiver 220. The appropriate rules and signal generation are described in further detail with respect to the following figures.

In an embodiment, the base station 200 forwards the measurement windows received from the network to a user equipment, either before or after it has performed collision resolution. If sent to the UE after collision resolution, this functions to notify the UE as to when and where the measurement windows should be expected. On the other hand, if send to the UE prior to collision resolution, the UE can carry out at least some of the above-described collision resolution functions. For example, the UE can determine that the measurement windows overlap. The UE can also decide, based on the overlap determination, when to carry out certain measurements. In one example, the UE may determine that the SMTC measurement window and the CSI-RS measurement window partially overlap. The UE may thus decide to measure CSI-RS outside of the SMTC measurement windows. Although the embodiments of this disclosure assume that the base station performs the collision resolution, it should be understood that the collision resolution of those embodiments could be equally carried out by the UE.

Figure 4:
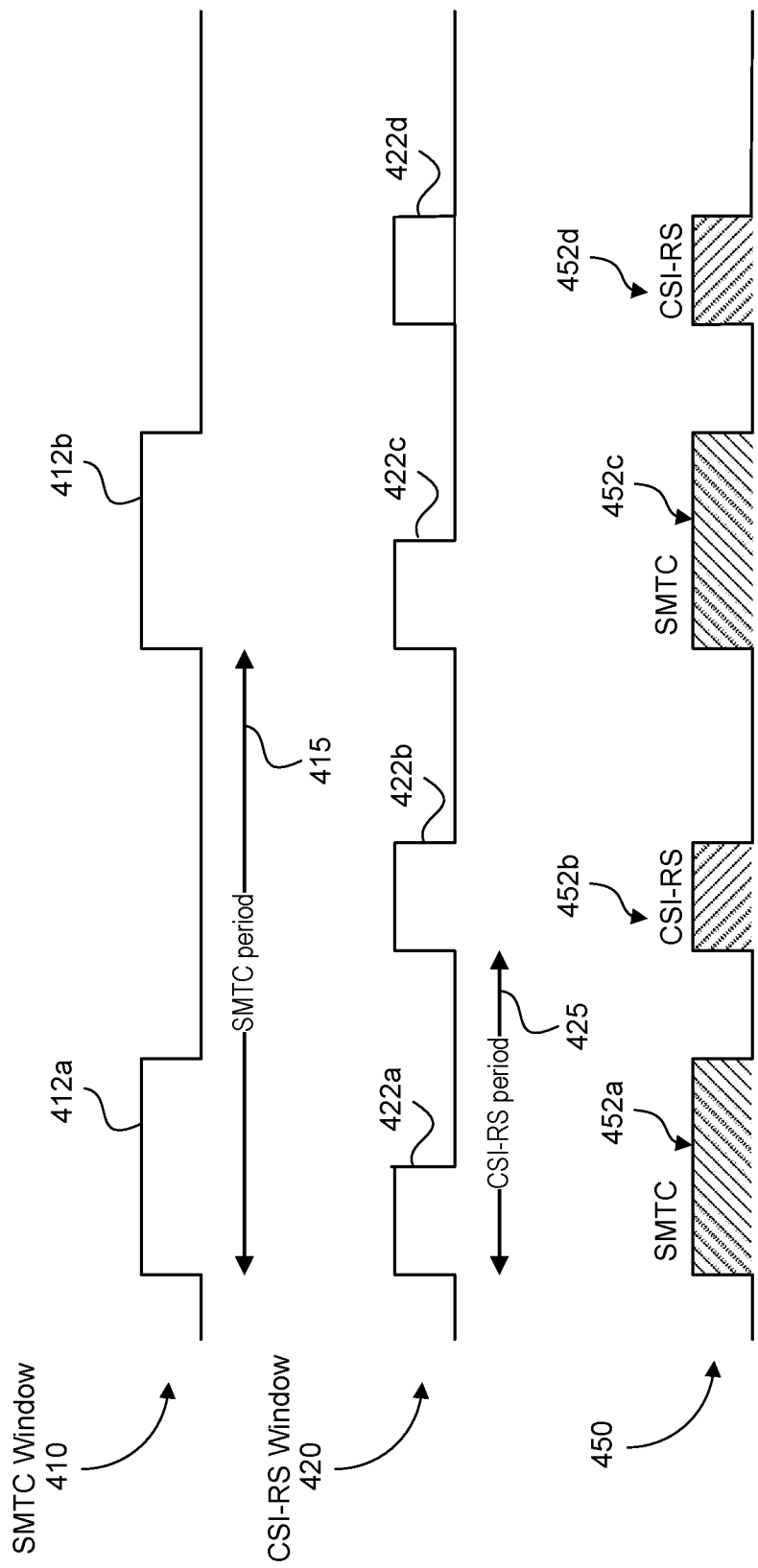
FIG. 4 illustrates exemplary measurement windows according to an embodiment.

FIG. 4 illustrates exemplary measurement windows according to an embodiment. As shown in FIG. 4, an SMTC measurement configuration 410 includes SMTC measurement windows 412a and 412b having a periodicity 415. Likewise, a CSI-RS measurement window configuration includes CSI-RS measurement windows 422a-422d with a window periodicity of 425. As shown in FIG. 4, when the measurement window configurations 410 and 420 are configured in this manner, the CSI-RS measurement window 422a completely overlaps with a portion of the SMTC measurement window 412a, and the CSI-RS measurements window 422c overlaps with the SMTC measurement window 412b. Meanwhile, CSI-RS measurement windows 422b and 422d do not collide with any other measurement windows.

In the embodiment of FIG. 4, a collision rule is a restriction rule that dictates that a CSI-RS measurement signal (which is transmitted during CSI-RS measurement windows) should only be transmitted during periods of non-overlap, and that the SMTC measurement signal should be transmitted during periods of overlap. In an embodiment, this rule is based on the SMTC measurement signal taking priority over CSI-RS measurements signals in general. In another embodiment, this priority results of the difference in periodicities of the SMTC and CSI-RS measurement windows. Specifically, because the CSI-RS measurement windows occur more often than the SMTC measurement windows (e.g., the CSI-RS measurement windows have a smaller periodicity than the periodicity of the SMTC measurement windows), priority is given to the SMTC windows during collision. In this embodiment, the rule selection 308 makes a determination from the received measurement windows as to which has the smaller periodicity in order to select the appropriate rule.

The resulting measurement signals are illustrated in the measurement transmission 450. The measurement transmission 450 includes four signal transmissions 452a-452d. As defined by the rule (discussed above), the SSB measurement signal is transmitted during the SMTC measurements window, regardless of overlap. Meanwhile, the CSI-RS measurement signal is only transmitted during non-overlapping CSI-RS measurement windows. Thus, the measurement transmission 450 includes SSB measurement signals transmitted during transmission periods 452a and 452c (corresponding to SMTC measurement windows 412a and 412b) and CSI-RS measurement signals transmitted during transmission periods 452b and 452d (corresponding to CSI-RS measurement windows 422b and 422d).

Figure 5:
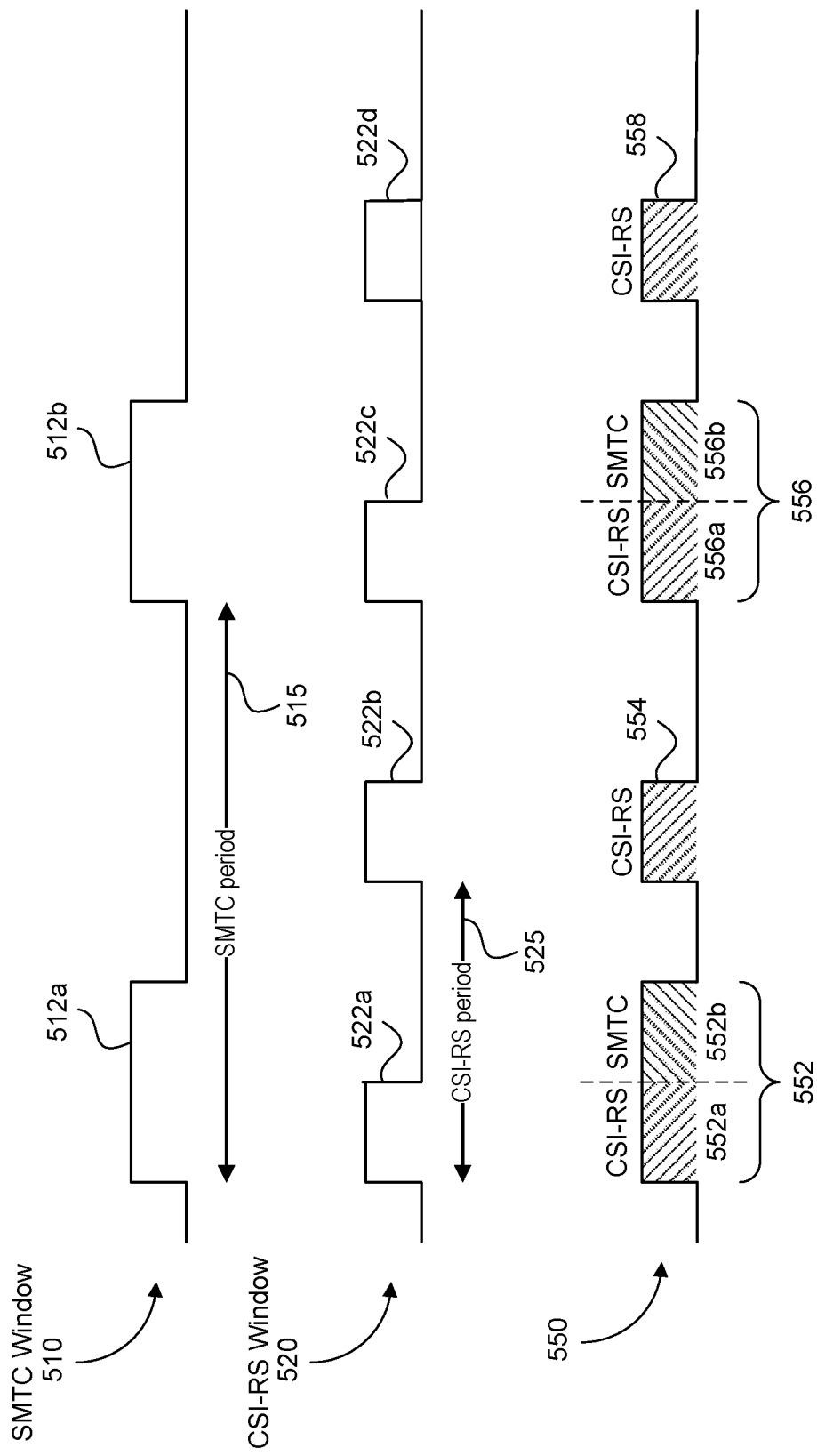
FIG. 5 illustrates collision resolution of multiple measurement windows according to an embodiment.

FIG. 5 illustrates collision resolution of multiple measurement windows according to an embodiment. As shown in FIG. 5, an SMTC measurement configuration 510 includes SMTC measurement windows 512a and 512b, having a periodicity 515. Meanwhile, the CSI-RS measurement configuration 520 includes CSI-RS measurement windows 522a-d, having a periodicity 525. As can be seen in FIG. 5, the periodicity 525 of the CSI-RS measurements windows is smaller than the periodicity 515 of the SMTC measurement windows.

As shown in FIG. 5, these configurations result in the CSI-RS measurement windows 522a and 522c overlapping (e.g., colliding) with portions of SMTC measurement windows 512a and 512b, respectively. Meanwhile, CSI-RS measurement windows 522b and 522d do not overlap with any other measurement windows.

In this embodiment, a measurement restriction rule is implemented, in which the CSI-RS measurement signals are given priority over the SMTC measurement signals. As a result, the rule dictates that, for periods of overlap between a CSI-RS measurement window 522 and an SMTC measurement window 512, the CSI-RS signal is transmitted and the SSB measurement signal (transmitted during an SMTC measurement window) is dropped.

The measurement signal transmission 550 illustrates the resulting measurement signal transmissions. As shown, during a first transmission window 552, the CSI-RS measurement signal is transmitted during a first portion 522a corresponding to the CSI-RS measurement window 522, taking priority over the overlapping portion of the SMTC window 512a. An SSB measurement signal is transmitted during the second portion 552b of the first transmission window 552, corresponding to the non-overlapping portion of the SMTC window 512a. Similarly, a third transmission window 556 is also parsed into two portions 556a and 556b. The CSI-RS measurement signal is transmitted during the first portion 556a corresponding to the CSI-RS measurement window 522c and an SSB measurement signal is transmitted during the second portion 556b corresponding to the non-overlapping portion of the SMTC measurement window 512b.

During a second transmission window 554 and a fourth transmission window 558, no collision resolution is needed. Thus, CSI-RS measurement signals are transmitted corresponding to the CSI-RS measurement windows 522b and 522d, respectively.

Figure 6:
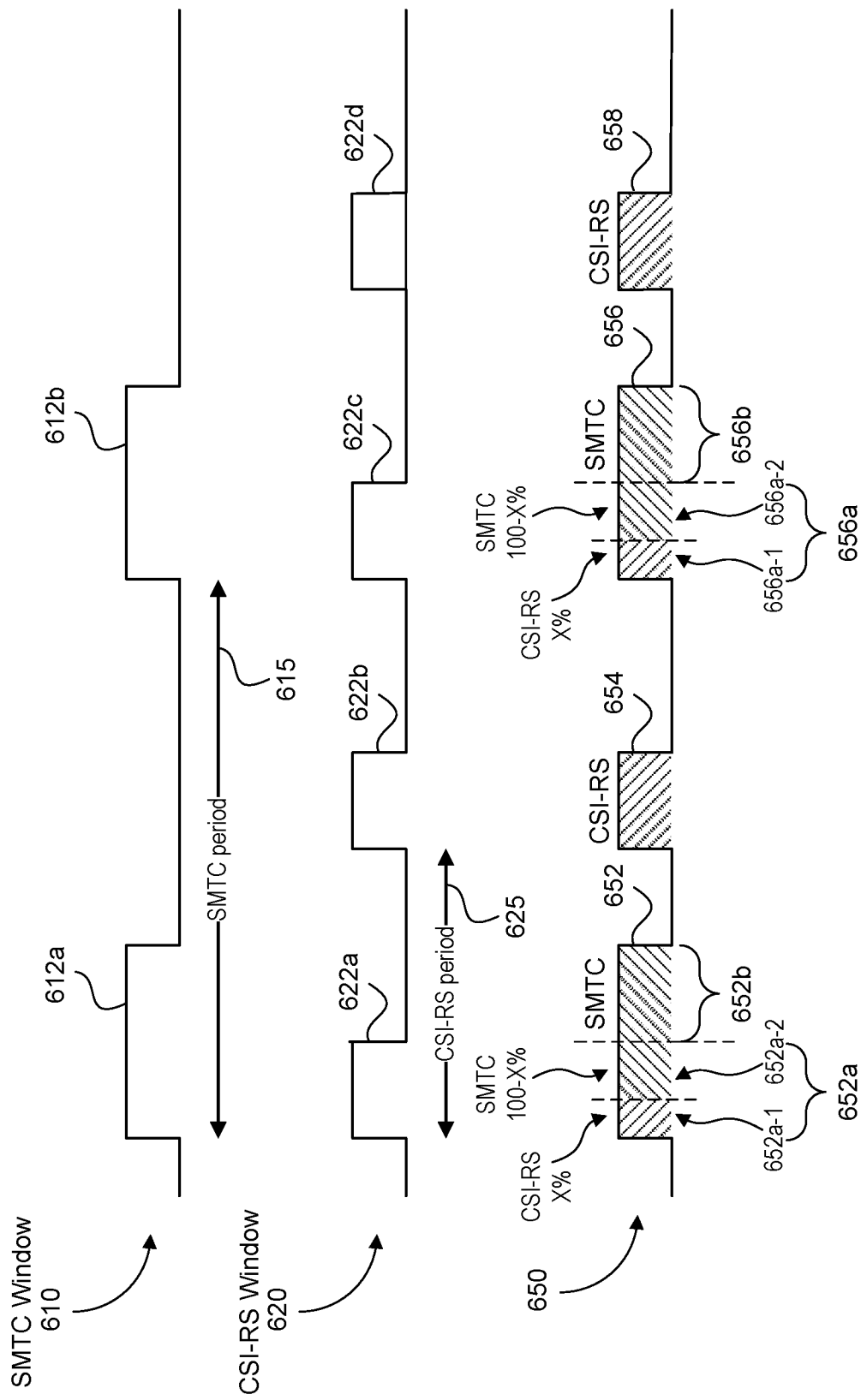
FIG. 6 illustrates collision resolution of multiple measurement windows according to an embodiment.

FIG. 6 illustrates collision resolution of multiple measurement windows according to an embodiment. As shown in FIG. 6, an SMTC measurement configuration 610 includes SMTC measurement windows 612a and 612b, having a periodicity 615. Meanwhile, the CSI-RS measurement configuration 620 includes CSI-RS measurement windows 622a-d, having a periodicity 625. As can be seen in FIG. 6, the periodicity 625 of the CSI-RS measurements windows is smaller than the periodicity 615 of the SMTC measurement windows.

As shown in FIG. 6, these configurations result in the CSI-RS measurement windows 622a and 622c overlapping (e.g., colliding) with portions of SMTC measurement windows 612a and 612b, respectively. Meanwhile, CSI-RS measurement windows 622b and 622d do not overlap with any other measurement windows.

In this embodiment, a measurement sharing rule is implemented, in which the CSI-RS measurement signals and the SMTC measurement signals share overlapping measurement periods according to a measurement sharing factor X %, where $0 \leq X \leq 100$. As a result, the rule dictates that, for periods of overlap between a CSI-RS measurement window 622 and an SMTC measurement window 612, the CSI-RS signal is transmitted only during the first X % of the overlapping period and the SSB measurement signal (transmitted during an SMTC measurement window) is transmitted only during the latter 100–X % of the overlapping period. In this scenario, a measurement period or delay is extended by 1/X %.

The measurement signal transmission 650 illustrates the measurement signal transmissions that result from the implementation of this rule. As shown, a first transmission window 652 includes a first portion 652a corresponding to the period of overlap between the CSI-RS measurement window 622a and the SMTC measurement window 612a. As dictated by the rule, a CSI-RS measurement signal is transmitted during a first sub-portion 652a-1 of the first portion 652a, which has a length of X % of the first portion 652a. An SSB measurement signal is transmitted during the second sub-portion 652a-2, which has a length of 100–X % of the first portion 652a. During the second portion 652b of the transmission window 652, because there is no overlap, the SSB measurement signal is transmitted corresponding to the non-overlapping portion of the SMTC measurement window 612a.

The transmission window 656 is configured similarly to the transmission window 652. Namely, a first portion 656a of the transmission window 656 corresponds to the period of overlap between CSI-RS measurement window 622c and SMTC measurement window 612b. Thus, during this first portion 656a, the rule dictates measurement sharing. Consequently, a CSI-RS measurement signal is transmitted during a first sub-portion 656a-1, which has a length equal to X % of the first portion 656. An SSB measurement signal is transmitted during the second sub-portion 656a-2, which has a length equal to 100–X % of the first portion 656a. The SSB measurement signal is further transmitted during the second portion 656b of the transmission window 656, corresponding to the non-overlapping portion of SMTC measurement window 612b. In the measurement sharing periods, the measurement period or delay could be extended by 1/X %.

During a second transmission window 654 and a fourth transmission window 658, no collision resolution is needed. Thus, CSI-RS measurement signals are transmitted corresponding to the CSI-RS measurement windows 622b and 622d, respectively.

In various embodiments, the measurement sharing factor X is preset by a standard, is selected based on relative periodicities of the CSI-RS and SMTC measurement windows, or is selected based on relative priorities of the CSI-RS and SMTC measurements.

Figure 7:
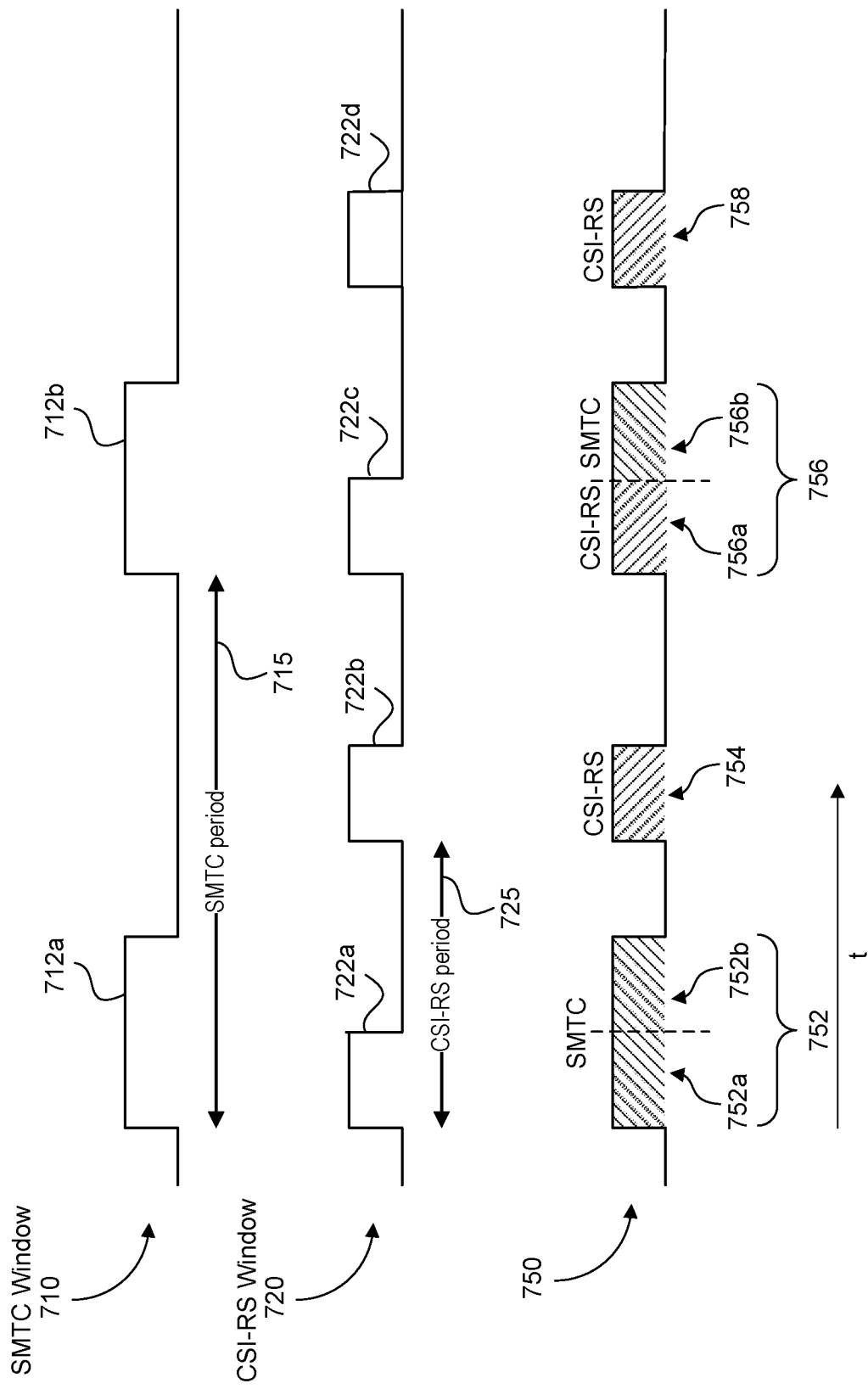
FIG. 7 illustrates collision resolution of multiple measurement windows according to an embodiment.

FIG. 7 illustrates collision resolution of multiple measurement windows according to an embodiment. As shown in FIG. 7, an SMTC measurement configuration 710 includes SMTC measurement windows 712a and 712b, having a periodicity 715. Meanwhile, the CSI-RS measurement configuration 720 includes CSI-RS measurement windows 722a-d, having a periodicity 725. As can be seen in FIG. 7, the periodicity 725 of the CSI-RS measurements windows is smaller than the periodicity 715 of the SMTC measurement windows.

As shown in FIG. 7, these configurations result in the CSI-RS measurement windows 722a and 722c overlapping (e.g., colliding) with portions of SMTC measurement windows 712a and 712b, respectively. Meanwhile, CSI-RS measurement windows 722b and 722d do not overlap with any other measurement windows.

In the embodiment of FIG. 7, a randomize measurement rule is implemented. Specifically, for each period of overlap the measurement rule selects one of the CSI-RS measurement signal or the SSB measurement signal at random. The measurement signal transmission 750 illustrates an example result of the randomized measurement rule. For example, a first transmission window 752 includes a first portion 752a that corresponds to the overlap between the CSI-RS measurement window 722a and a portion of the SMTC measurement window 712a. During this first portion 752a, the measurement rule randomly selects to transmit the SSB measurement signal. Thus, the SSB measurement signal is transmitted during the first portion 752a as well as during the second portion 752b corresponding to the non-overlapping portion of SMTC measurement window 712a.

A similar configuration occurs with respect to transmission window 756, which also includes an overlapping portion 756a. In this example, the measurement rule randomly selects to transmit the CSI-RS measurement signal during the overlapping portion 756a. Thus, the CSI-RS measurement signal is transmitted during the first portion 756a of the transmission window 756, corresponding to the overlapping portions of CSI-RS measurement window 722c and SMTC window 712b. Meanwhile, the SSB measurement signal is transmitted during second portion 756b corresponding to the non-overlapping portion of SMTC window 712b.

During a second transmission window 754 and a fourth transmission window 758, no collision resolution is needed. Thus, CSI-RS measurement signals are transmitted corresponding to the CSI-RS measurement windows 722b and 722d, respectively.

Figure 8:
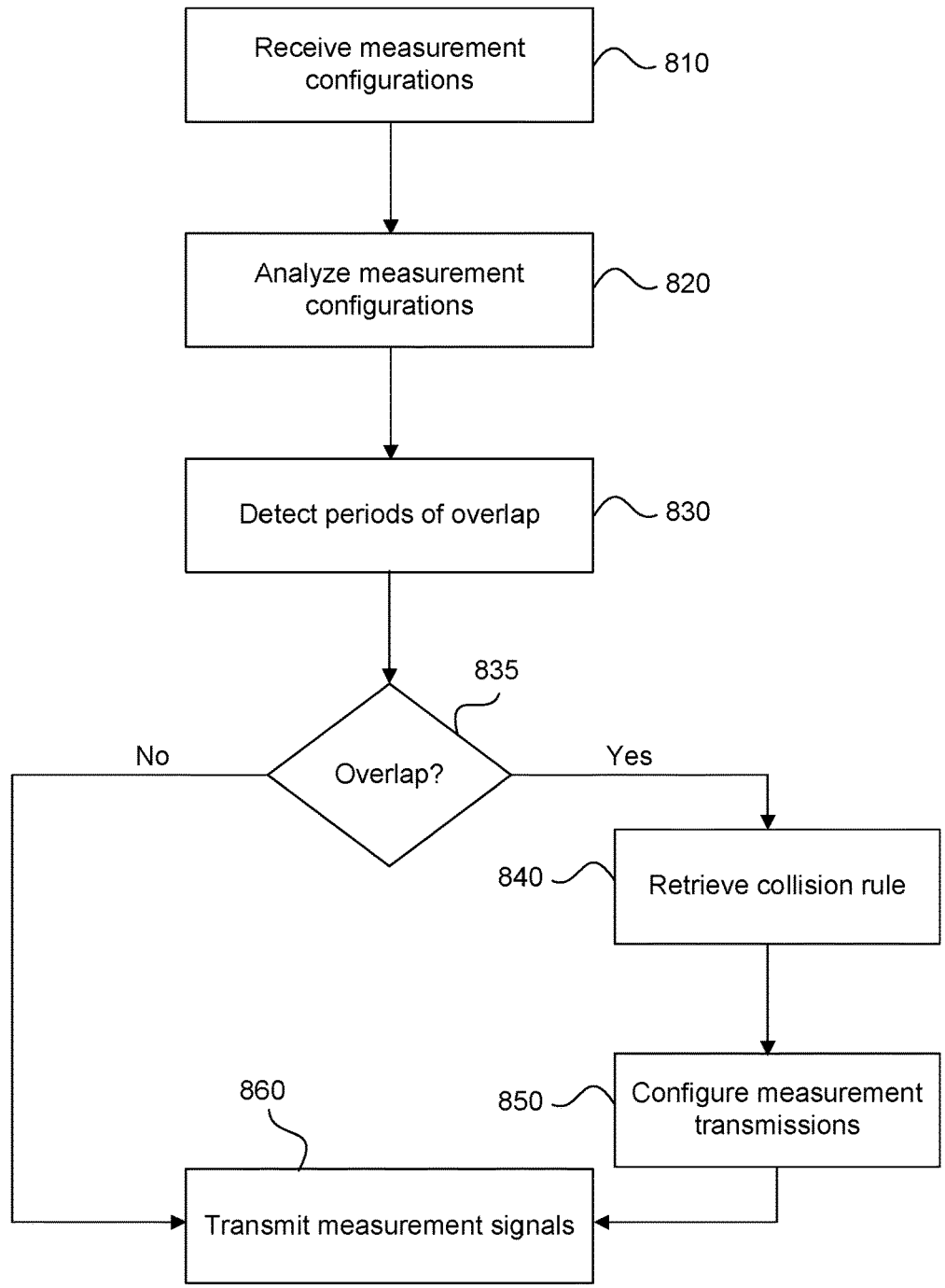
FIG. 8 illustrates a flowchart diagram of an exemplary method 800 for resolving conflicts among measurement configurations.

FIG. 8 illustrates a flowchart diagram of an exemplary method 800 for resolving conflicts among measurement configurations. As shown in FIG. 8, the method 800 begins by receiving the measurement configurations (810) for the SMTC and CSI-RS. Once received, the measurement configurations are analyzed (820) in order to determine the resource elements to which their respective measurement windows are assigned. Based on this analysis, periods of overlap (e.g., collision) are detected (830). If there are no collisions (835—N), then the CSI-RS measurements signals and the SSB measurement signals are transmitted (860) according to the CSI-RS and SMTC measurement configurations, respectively.

Alternatively, if one or more collisions are detected (835—Y), a collision rule is retrieved (840). As discussed above, the collision rule dictates which of the measurement signals to transmit during a period of overlap, or dictates a method for determining which measurement signal to transmit during a period of overlap. Based on the collision rule, a measurement transmission is configured (850). Specifically, as discussed above, the measurement rule may establish one of the measurement signals as having priority over the other, may condition priority based on the respective periodicities of the measurement signals, may establish measurement sharing based on a measurement sharing factor, or may establish random selection. Based on the measurement rule, the measurement transmission is configured that includes the measurement signals resulting from the measurement windows and collision resolution. These measurement signals are then transmitted (860) to the UE.

Figure 9:
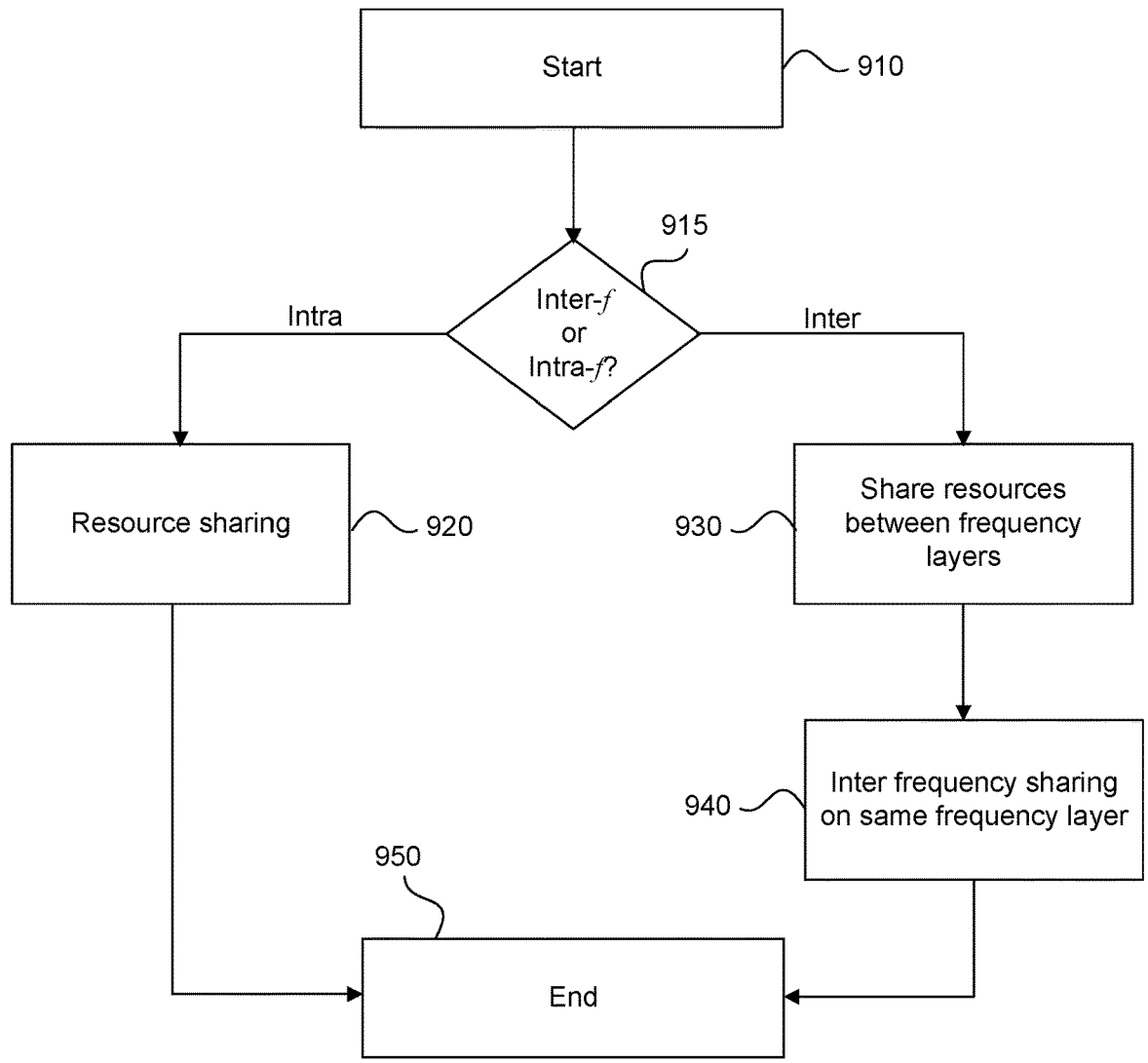
FIG. 9 illustrates a method 900 for resolving measurement collisions with a measurement gap.

Whereas the above embodiments of FIGS. 4-8 provide solutions for carrying out measurements when no measurement gap has been provided, FIG. 9 illustrates a method 900 for resolving measurement collisions with a measurement gap.

The method begins with the start of measurement in the measurement gap (910), during which time the UE determines the resource sharing to be carried out. Thereafter, a determination is then made as to whether the measurements are intra-frequency (in the same frequency layer) or inter-frequency (in different frequency layers) (915). At this time, measurement gap usage sharing between inter-frequency and intra-frequency measurements are also carried out. If it is determined that the measurements are intra-frequency (915—Intra), measurement resources are shared (920) between intra-frequency CSI-RS L3 measurement and intra-frequency SSB L3 measurement. Then, the UE completes the measurement with the measurement gap and the method ends (950).

Alternatively, if it is determined that measurements are inter-frequency (915—inter), each frequency layer equally shares the measurement resource (930). Subsequently, on one frequency layer, the UE further performs measurement sharing between the inter-frequency CSI-RS L3 measurement and the inter-frequency SSB L3 measurement on this same layer (940). The UE then completes the measurement with the measurement gap and the method ends (950).

Figure 10:
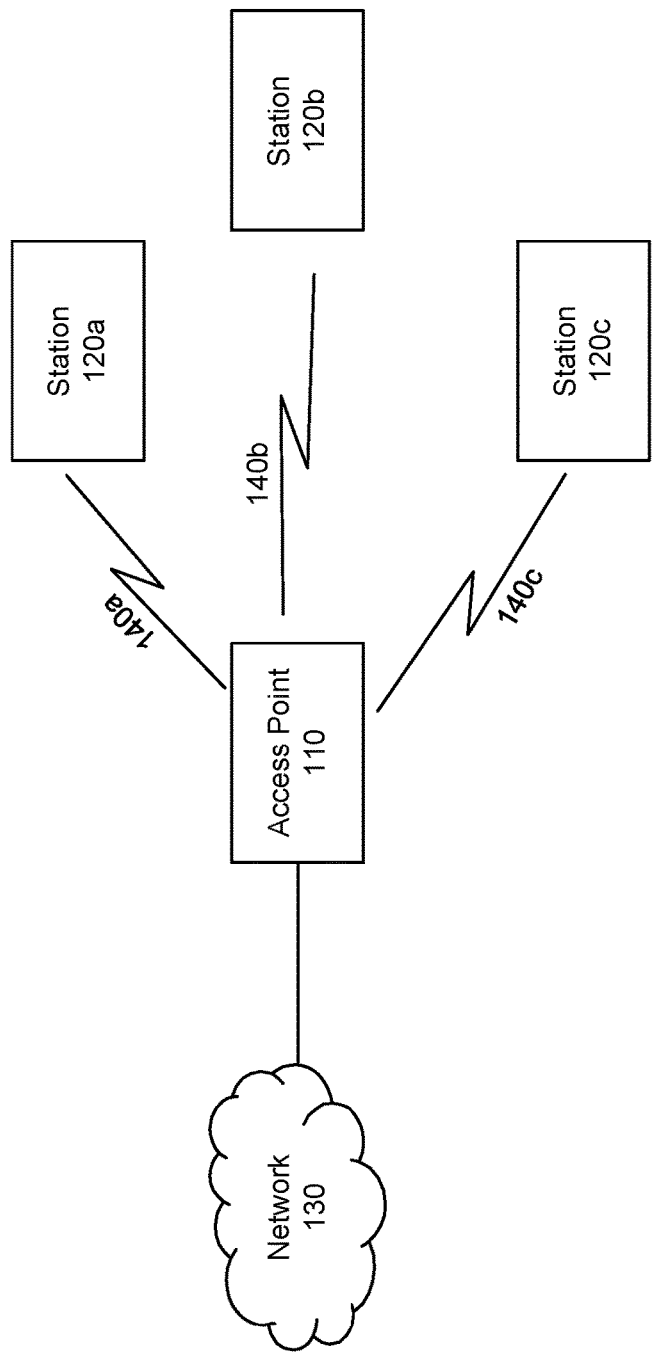
FIG. 10 illustrates an example system implementing measurement collision resolution, according to some embodiments of the disclosure.

FIG. 10 illustrates an example system 1000 implementing measurement signal collision resolution, according to some embodiments of the disclosure. Example system 1000 is provided for the purpose of illustration only and does not limit the disclosed embodiments. System 1000 may include, but is not limited to, access point (AP) 1010, stations (STA) 1020, and network 1030. Stations 1020a-1020c may include, but are not limited to, Wireless Local Area Network (WLAN) stations such as wireless communication devices, smart phones, laptops, desktops, tablets, personal assistants, monitors, televisions, wearable devices, and the like. Access point (AP) 1010 may include but is not limited to WLAN electronic devices such as a wireless router, a wearable device (e.g., a smart watch), a wireless communication device (e.g., a smart phone), or a combination thereof. Network 1030 may be the Internet and/or a WLAN. Station 1020's communications are shown as wireless communications 1040. The communication between AP 1010 and STA 1020 can take place using wireless communications 1040a-1040c. The wireless communications 1040a-1040c can be based on a wide variety of wireless communication techniques. These techniques can include, but are not limited to, techniques based on IEEE 802.11 (such as, but not limited to, IEEE 802.11ac, IEEE 802.11ax, IEEE 802.11bc, IEEE 802.11bd, IEEE 802.11be, IEEE 802.11v, etc.)

Figure 11:
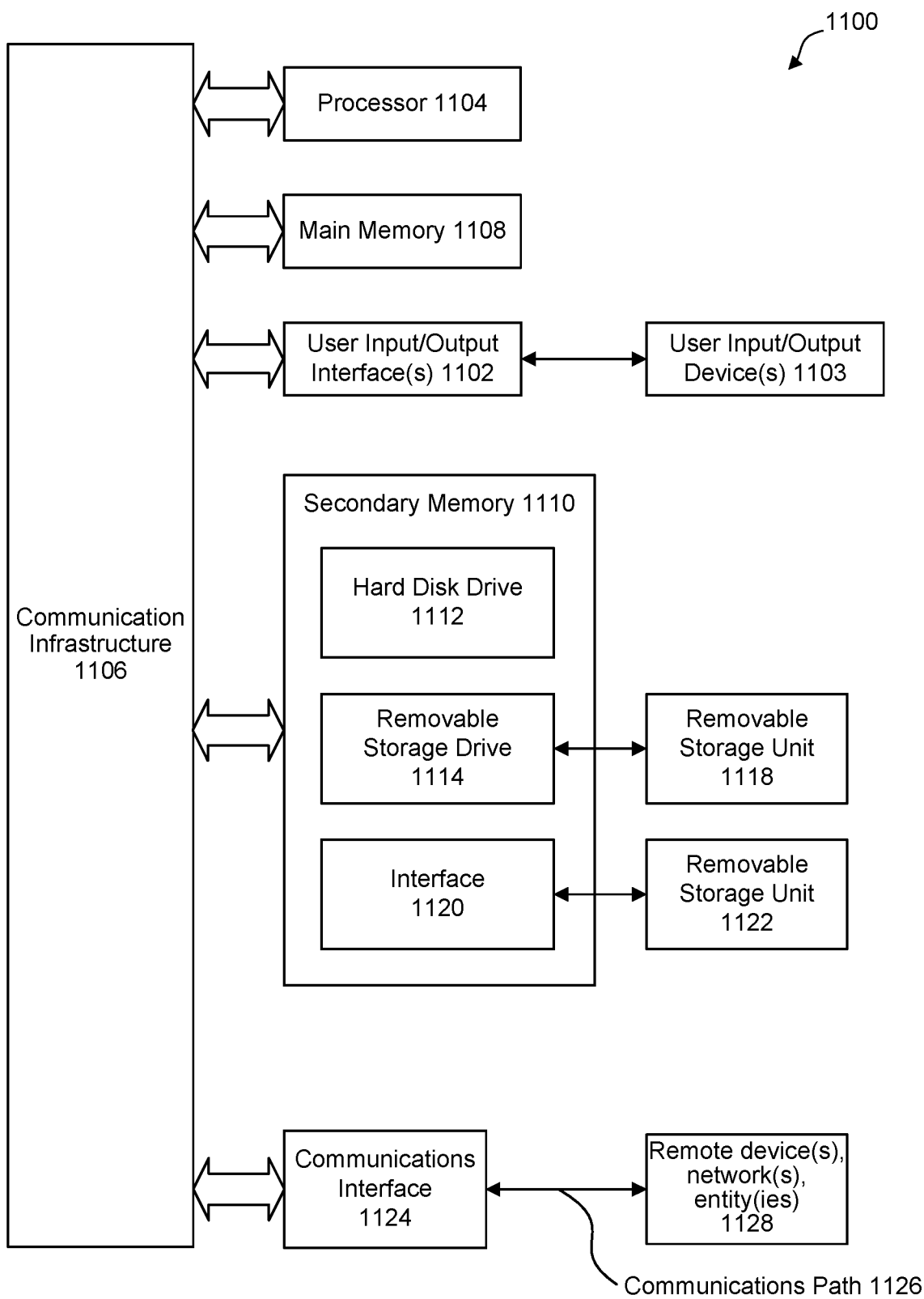
FIG. 11 is an example computer system for implementing some embodiments or portion(s) thereof.

Various embodiments can be implemented, for example, using one or more computer systems, such as computer system 1100 shown in FIG. 11. Computer system 1100 can be any well-known computer capable of performing the functions described herein such as devices 1010, 1020 of FIG. 10, or 200 of FIG. 2. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for resolving measurement collision in a wireless communication system, the method comprising:
    identifying a period of overlap in which a synchronization signal block (SSB) based measurement timing configuration (SMTC) measurement window overlaps with a channel state information reference signal (CSI-RS) measurement window;
    storing a set of overlap rules that govern measurement signal transmissions during the period of overlap;
    determining for the period of overlap, whether to transmit an SMTC measurement signal, a CSI-RS measurement signal, or a portion of both the SMTC measurement signal and the CSI-RS measurement signal based on the stored set of overlap rules;
    assigning at least one of the SMTC measurement signal and the CSI-RS measurement signal to collision resource elements corresponding to the period of overlap based on the determining; and
    transmitting the at least one of the SMTC measurement signal or the CSI-RS measurement signal to a user equipment (UE) based on the assigning.

2. The method of claim 1, wherein the assigning includes assigning the SMTC measurement signal to a subset of the collision resource elements, and assigning the CSI-RS measurement signal to a remainder of the collision resource elements according to a measurement sharing factor (MSF).

3. The method of claim 2, wherein the MSF is a percentage in the range of 0 to 100.

4. The method of claim 3, wherein the subset of the collision resource elements corresponds to a first MSF % of the collision resource elements, and
wherein the remainder of the collision resource elements corresponds to a latter (100−MSF) % of the collision resource elements.

5. The method of claim 1, further comprising:
comparing a periodicity of the SMTC measurement window with a periodicity of the CSI-RS measurement window.

6. The method of claim 5, further comprising:
identifying a shorter measurement window as one of the SMTC measurement window or the CSI-RS measurement window having a shorter periodicity than the other of the SMTC measurement window or the CSI-RS measurement window,
wherein the assigning includes assigning the shorter measurement window to a period of non-overlap.

7. The method of claim 5, further comprising:
storing a measurement sharing factor (MSF) as a percentage in the range of 0 to 100;
identifying a shorter measurement signal as one of the SMTC measurement signal or the CSI-RS measurement signal having a shorter periodicity than a longer measurement signal being the other of the SMTC measurement signal or the CSI-RS measurement signal,
wherein the assigning includes:
assigning the shorter measurement signal to occur during a first MSF % of the period of overlap; and
assigning the longer measurement signal to occur during a latter (100-MSF) % of the period of overlap.

8. A method for resolving measurement collision in a wireless communication system, the method comprising:
receiving a synchronization signal block (SSB) based measurement timing configuration (SMTC) measurement allocation corresponding to an SMTC measurement;
receiving a channel state information reference signal (CSI-RS) measurement allocation corresponding to a CSI-RS measurement;
identifying at least one collision resource element based on the SMTC measurement allocation and the CSI-RS measurement allocation;
retrieving a collision rule in response to the identifying;
assigning at least one of an SMTC measurement signal or a CSI-RS measurement signal to the at least one collision resource element based on the collision rule; and
transmitting a signal frame that includes the assigned measurement signals.

9. The method of claim 8, wherein the SMTC measurement allocation identifies resource elements in the signal frame to which the SMTC measurement signal should be assigned, and
wherein the CSI-RS measurement allocation identifies resource elements in the signal frame to which the CSI-RS measurement signal should be assigned.

10. The method of claim 8, wherein the SMTC measurement allocation and the CSI-RS measurement allocation are received from a network.

11. The method of claim 8, wherein the at least one collision resource element corresponds to at least one resource element of the signal frame to which both the SMTC measurement allocation has designated for use by the SMTC measurement signal and the CSI-RS measurement allocation has designated for use by the CSI-RS measurement signal.

12. The method of claim 8, wherein the collision rule includes a measurement sharing factor (MSF) that defines a percentage of the collision resource elements to be assigned to for one of the SMTC measurement signal or the CSI-RS measurement signal.

13. The method of claim 8, wherein the collision rule includes a priority that dictates whether to allocate collision resource elements with the SMTC measurement signal or the CSI-RS measurement signal.

14. The method of claim 8, wherein the collision rule identifies a variable and a formula for calculating the collision resource element assignment.

15. A base station for resolving measurement collision in a wireless communication system, the base station comprising:
a transceiver configured to perform wireless communication; a memory that stores a collision rule governing collision measurement signal assignments; and
one or more processors configured to:
identify a collision period in which a synchronization signal block (SSB) based measurement timing configuration (SMTC) measurement window overlaps with a channel state information reference signal (CSI-RS) measurement window;
determine for the collision period, whether to transmit an SMTC measurement signal, a CSI-RS measurement signal, or both the SMTC measurement signal and the CSI-RS measurement signal based on the stored collision rule; and
assign at least one of the SMTC measurement signal or the CSI-RS measurement signal to resource elements within the collision period based on determining to generate a measurement signal frame,
wherein the transceiver is further configured to transmit the measurement signal frame to a user equipment (UE).

16. The base station of claim 15, wherein the overlap between the SMTC measurement window and the CSI-RS measurement window occurs in both frequency and time.

17. The base station of claim 15, wherein the one or more processors are configured to:
assign the SMTC measurement signal to a subset of the collision resource elements, and
assign the CSI-RS measurement signal to a remainder of the collision resource elements according to a measurement sharing factor (MSF) defined by the collision rule.

18. The base station of claim 17, wherein the MSF is a percentage in the range of 0 to 100.

19. The base station of claim 18, wherein the SMTC measurement signal is assigned to a first MSF % of the resource elements within the collision period, and
wherein the CSI-RS measurement signal is assigned to a latter (100−MSF) % of the resource elements within the collision period.

20. The base station of claim 15, wherein the collision rule dictates randomly selecting the SMTC measurement signal or the CSI-RS measurement signal for assigning to the collision period.

* * * * *